United States Patent
Pershin et al.

(10) Patent No.: US 9,336,039 B2
(45) Date of Patent: May 10, 2016

(54) DETERMINING STATUS OF MIGRATING VIRTUAL MACHINES

(71) Applicant: VMware, Inc., Palo Alto, CA (US)

(72) Inventors: Aleksey Pershin, Fremont, CA (US); Min Cai, Sunnyvale, CA (US); Ilia Langouev, Santa Cruz, CA (US); Gabriel Tarasuk-Levin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 2 days.

(21) Appl. No.: 14/316,729

(22) Filed: Jun. 26, 2014

(65) Prior Publication Data

US 2015/0378759 A1 Dec. 31, 2015

(51) Int. Cl.
G06F 9/455 (2006.01)
G06F 9/48 (2006.01)
G06F 9/50 (2006.01)

(52) U.S. Cl.
CPC ........ G06F 9/45558 (2013.01); *G06F 9/45533* (2013.01); *G06F 9/4856* (2013.01); *G06F 9/5088* (2013.01); *G06F 2009/4557* (2013.01)

(58) Field of Classification Search
CPC . G06F 9/45533; G06F 9/4856; G06F 9/5088; G06F 2009/4557
USPC ............................................. 718/1; 717/136
See application file for complete search history.

(56) References Cited

U.S. PATENT DOCUMENTS

| | | | | |
|---|---|---|---|---|
| 8,689,054 B1 * | 4/2014 | van der Goot | ...... | G06F 11/1438 714/43 |
| 8,910,152 B1 * | 12/2014 | Hyser | ................. | G06F 9/45558 718/1 |
| 2008/0270564 A1 * | 10/2008 | Rangegowda | ........ | G06F 9/5088 709/212 |
| 2010/0131944 A1 * | 5/2010 | Iorio | ..................... | G06F 9/4856 718/1 |
| 2010/0299130 A1 * | 11/2010 | Mitsuzawa | ............ | G06F 9/4856 703/26 |
| 2011/0099548 A1 * | 4/2011 | Shen | .................... | G06F 9/45558 718/1 |
| 2011/0131576 A1 * | 6/2011 | Ikegaya | .................. | G06F 9/455 718/1 |
| 2011/0161491 A1 * | 6/2011 | Sekiguchi | ............. | G06F 9/5077 709/224 |
| 2011/0179415 A1 * | 7/2011 | Donnellan | .......... | G06F 9/45558 718/1 |
| 2014/0165063 A1 * | 6/2014 | Shiva | ...................... | G06F 21/57 718/1 |
| 2014/0181813 A1 * | 6/2014 | Deshpande | ......... | G06F 9/45533 718/1 |
| 2014/0208049 A1 * | 7/2014 | Furusawa | .............. | G06F 3/0647 711/162 |

* cited by examiner

*Primary Examiner* — Phillip H Nguyen (57) ABSTRACT

Systems and techniques are described for determining the status of migrating virtual machines. A described technique includes initiating a migration of one or more virtual machines from a source host that is located at a source site to a destination host that is located at a destination site. A determination is made that a fault has occurred during the migration of the one or more virtual machines. In response to determining that the error has occurred, a determination is made, for each virtual machine of the one or more virtual machines, whether the virtual machine has been fully migrated from the source host to the destination host.

20 Claims, 4 Drawing Sheets

DETERMINING STATUS OF MIGRATING VIRTUAL MACHINES

BACKGROUND

This document relates to determining the status of virtual machines being transferred between computers.

A virtual machine (VM) is a software-based abstraction of a physical computer system. A VM is executed on a physical computer through the use of virtualization software typically referred to as a "hypervisor." A physical computer system, referred to herein as a host, can execute one or more VMs. The hypervisor is software that is logically interposed between and interfaces with a VM and a physical computer system. In general, each VM is configured to execute an operating system, referred to herein as a guest OS, and applications.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for determining the status of virtual machines (VMs) that are being migrated from a source host to a destination host. The status for a VM can indicate, for example, that the VM has been migrated successfully, that the VM is in the process of being migrated, or that migration of the VM has not started. The source host may be a physical machine at a source site that manages the execution of the VMs and the destination host may be a physical machine at a destination site that is capable of managing the execution of the VMs. One or more VMs may be migrated from a source host to a destination host as part of a planned failover. For example, a site recovery manager (SRM) may be configured to migrate the VMs from the source host to the destination host in anticipation of a failure or a disaster that is about to occur at the source host or source site.

During a planned failover, each VM may be migrated from a source host to a destination host while the VM is still running at the source host. In general, to migrate a VM from a source host to destination host, data relating to the VM, e.g., data stored in virtual memory, data stored in a virtual disk, non-memory state information, and any virtual devices of the VM, is transferred to the destination host. As the data stored in the virtual disk and virtual memory may take some time to transfer, the data may be transferred from the source host to the destination host while the VM continues to execute on the source host. If a memory page of the VM is modified at the source host, the updated memory page may be transferred. Once the data stored in virtual memory and the virtual disk are transferred such that few or no modified memory pages or memory blocks need to be transferred, the VM can be paused at the source host. Any remaining memory pages and the non-memory state information can be transferred to the destination host while the VM is paused and the VM can then be restarted at the destination host. Advantageously, this minimizes downtime for the VM, e.g., by allowing the VM to only be paused for a brief amount of time.

If a fault or disaster occurs at the source site or at a source host located at the source site during the migration, it may be difficult to determine which VMs have been fully migrated to the destination host. For example, source host(s) at the host site may be unavailable, leaving only the servers located at the destination site available for determining the status of the VMs.

Techniques described herein allow for a SRM (or other appropriate device or component) to determine the status of one or more VMs being transferred between hosts. In some implementations, one or more physical machines located at the destination site can store information regarding the status of each VM based on actions that occur as part of the migration process. This information can be stored at the destination site or at a remote location so that a physical machine at the destination site can evaluate the status data to determine the status of the VM(s).

For example, a destination SRM and one or more destination hosts can each store data regarding the status of VMs that are about to be migrated, that have been migrated and/or that are in the process of being migrated. This data may be stored in response to particular actions being completed. For example, a migration started event may be stored prior to actually migrating a VM and a migration completed record may be stored after the migration has completed. The destination SRM can use the stored data to determine the status of the migration of the VMs, for example, in response to a fault or disaster occurring at the source site or to the source host during the migration. For example, if the destination VM has a migration started record but no migration completed record for a particular VM, the SRM may determine that the VM is in the process of being migrated.

VMs that have been successfully migrated may be executed by the destination host. VMs that have not been successfully migrated may be restarted by the destination host, or may be given some amount of time to finish migrating before restarting the VM. For example, the source host from which the VM is being migrated may still be available while other source hosts may not be available due to the fault or disaster.

Particular embodiments of the subject matter described in this document can be implemented so as to realize one or more of the following advantages. The status of VMs being migrated from a source site to a destination site can be determined based on data stored at a destination site in the event that physical machines at the source site become unavailable or destroyed. The status can be determined based on data stored by one or more physical machines located at the destination site such that sophisticated interactions between multiple physical machines at multiple sites can be avoided. Components involved in the process of migrating the VMs can perform their respective migration actions and migration status data storage actions independently from other components in the process. The use of two-phase commit protocols between multiple machines at multiple sites can also be avoided due to the independent storage of migration status data that is accessible by a computer system—e.g., a physical machine or VM—that determines the status of VMs based on the data.

Figure 1:
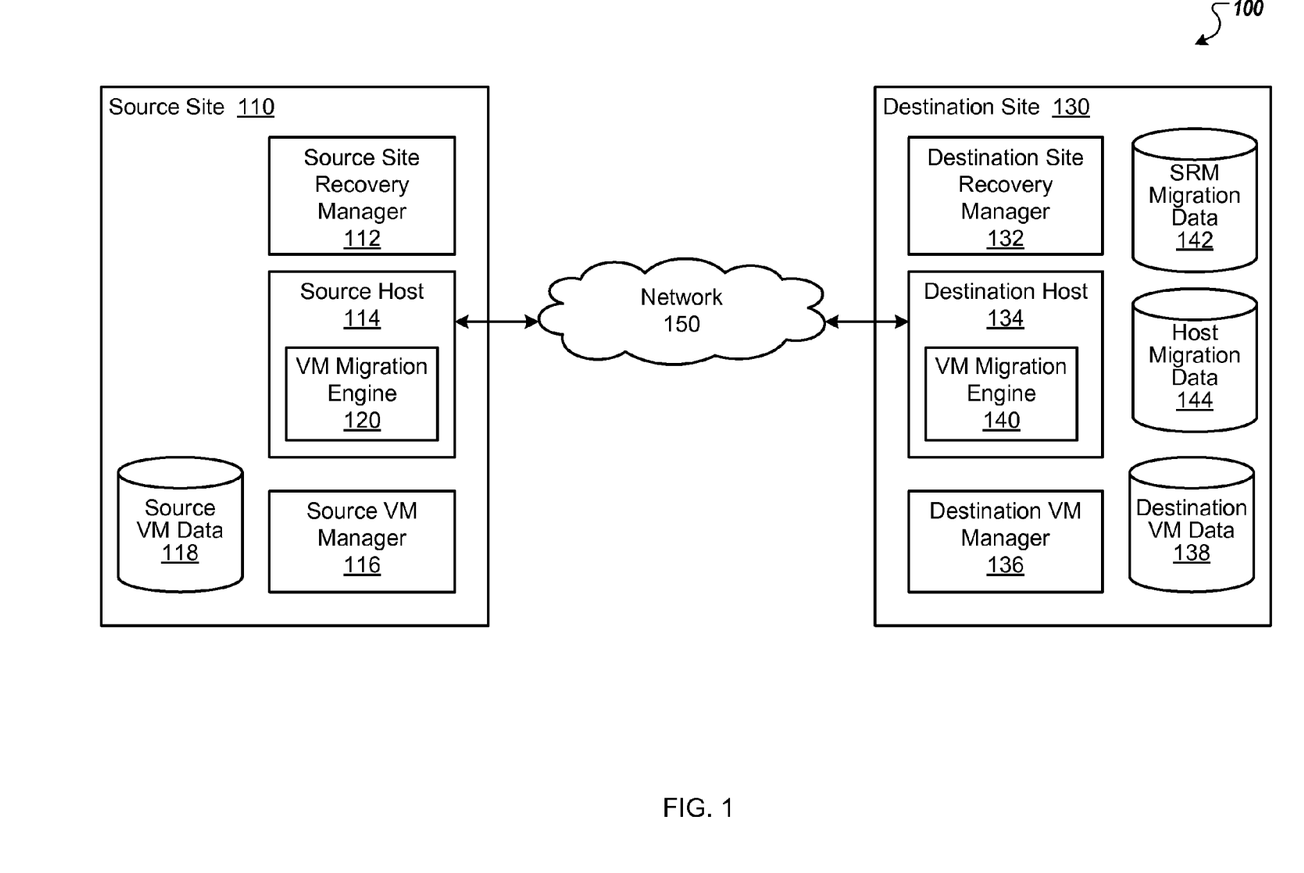
FIG. 1 shows an architecture for an example system that is configured to migrate one or more VMs from a source host to a destination host.

FIG. 1 shows an architecture for an example system 100 that is configured to migrate one or more VMs from a source host 114 to a destination host 134. The source host 114 is located at a source site 110 that also includes a source SRM 112, a source VM manager 116, and a source VM datastore 118. The source site 110 may be a datacenter, building, or other appropriate physical location for housing the SRM 112, source host 114, source VM manager 116, and VM datastore 118. Similarly, the destination host 134 is located at a destination site 130, e.g., a datacenter, building, or other appropriate location. The destination site 130 can be a different site than the source site 110 and includes the destination host 134, a destination SRM 132, a destination VM manager 136, and a destination VM datastore 138. In some implementations, the source SRM 112, source VM manager 116, destination SRM 132, and the destination VM manager 136 are each implemented as software executing on a respective server.

The source host 114 is configured to execute one or more VMs using a hypervisor. As described in more detail with reference to FIG. 2, the source host 114 is a physical computer system that includes one or more data processing apparatus. The source host 114 includes a VM migration engine 120 that transmits data for VMs to the destination host 134 over a network 150 during migration of the VMs. The network 150 can be, e.g., a local area network (LAN) or a wide area network (WAN), e.g., the Internet, or a combination of networks.

The destination host 134, which is also a physical machine that is configured to execute one or more VMs, includes a VM migration engine 140 that interacts with the VM migration engine 120 to receive the data for the VMs. The destination host 134 can execute VMs that have been migrated to the destination host 134 from the source host 114. Although only one source host 114 and one destination host 134 are illustrated in FIG. 1, the source site 110 can include multiple source hosts and the destination site 130 can include multiple destination hosts.

The SRMs 112 and 132 manage the migration of VMs from the source host 114 to the destination host 134. The SRMs 112 and 132 may enable users to configure recovery plans for VMs. For example, the source SRM 112 may enable users to configure a recovery plan for VMs executed by the source host 114. The recovery plan may specify the destination host 134 to which the VMs are to be migrated, a sequence in which the VMs should be migrated, and/or a sequence in which the VMs should be restarted, among other things.

The source VM manager 116 manages the source host 114 and any other hosts located at the source site 110. For example, the source VM manager 116 may be a centralized server that coordinates and manages the execution of VMs within the source site 110. The source VM manager 116 may also coordinate the migration of VMs from the source host 114—and any other hosts located at the source site 110—to the destination host 134 or another destination host. For example, the source VM manager 116 may receive a request from the source SRM 112 to migrate VMs executing at the source site 110 to the destination site 130. In response, the source VM manager 116 may instruct the source host(s) to migrate the VMs to destination host(s) at the destination site 130. Similarly, the VM manager 136 may be a centralized server that manages the destination host 134 and/or other hosts located at the destination site 130.

The source VM datastore 118 may store data regarding VMs executing at the source site 110. For example, the VM datastore 118 may store a unique identifier, e.g., a universally unique identifier (UUID), for each VM, data identifying the host on which each VM is executing, and other appropriate information for each VM. The destination VM datastore 138 may store similar data for VMs executing at the destination site 130. The destination datastore 138 may also include a VM inventory that identifies VMs that have been created and/or that are executing on the destination host 134 or another host at the destination site 130. For example, the VM inventory may include data specifying a unique identifier, e.g., UUID, for each VM that has been created and/or that is executing at the destination site 130.

The destination site 130 also includes an SRM migration data storage system 142 and a host migration data storage system 144 that each stores data regarding the status of VMs being migrated to, or that are planned to be migrated to, the destination site 130. For example, the SRM migration data storage system 142 may include migration data by the destination SRM 132 during the migration process. Similarly, the host migration data storage system 144 may include migration data stored by the destination host 134 during the migration process. As described in more detail below, the migration data for a VM may include data that can be used to determine whether migration of the VM has been initiated, is in progress, has completed, or has failed. Although this diagram depicts the SRM migration data storage system 142 and the host migration data storage system 144 as separate data storage systems, the SRM migration data storage system 142 and the host migration data storage system 144 may be implemented using a single data storage system, e.g., a single database.

During a planned failover, the destination SRM 132 may initiate the migration of one or more VMs from the source host 114 to the destination host 134. For example, the destination SRM 132 may receive a command, e.g., from a user, to initiate the failover. In response, the destination SRM 132 may make a remote call to the source SRM 112 to migrate the VM(s). In turn, the source SRM 112 may instruct the source VM manager 116 to migrate each of the VM(s), e.g., in a sequence. The source VM manager 116 then instructs the source host 114 to migrate the VM to the destination host 134. The VM migration engine 120 of the source host 114 then interacts with the VM migration engine 140 at the destination host 134 to transfer data for the VM—e.g., data stored in virtual memory, data stored in a virtual disk, or both—from the source host 114 to the destination host 134. After the data is transferred to the destination host 134, the VM may be executed at the destination host 134 rather than the source host 114. As described in more detail below, the destination SRM 132 and the destination host 134 store data regarding the migration of each VM for which migration has been initiated in the SRM migration data storage system 142 and the host migration data storage system 144, respectively, so that the status of the VM migration can be determined.

Although this diagram depicts the source SRM 112, the source host 114, and the source VM manager 116 as separate physical machines, e.g., separate servers, such depiction is merely for illustrative purposes. Similarly, the depiction of the destination SRM 132, the destination host 134, and the destination VM manager 136 as separate physical machines, e.g., separate servers, is merely for illustrative purposes. The objects/processes portrayed in this figure can be arbitrarily combined or divided into separate components. Furthermore, such objects/processes, regardless of how they are combined or divided, can execute on the same computer or can be distributed among different computers connected by one or more networks.

In addition, although the techniques and systems described herein for determining the status of VMs being migrated from a source host to a destination host, the techniques can be used in other applications. For example, the described techniques can be used in multi-server environments in which the outcome of a distributed operation, i.e., an operation that involves data being transferred from a source computer at a source site to a target computer at a target site, is determined based only on data stored at the target site.

Figure 2:
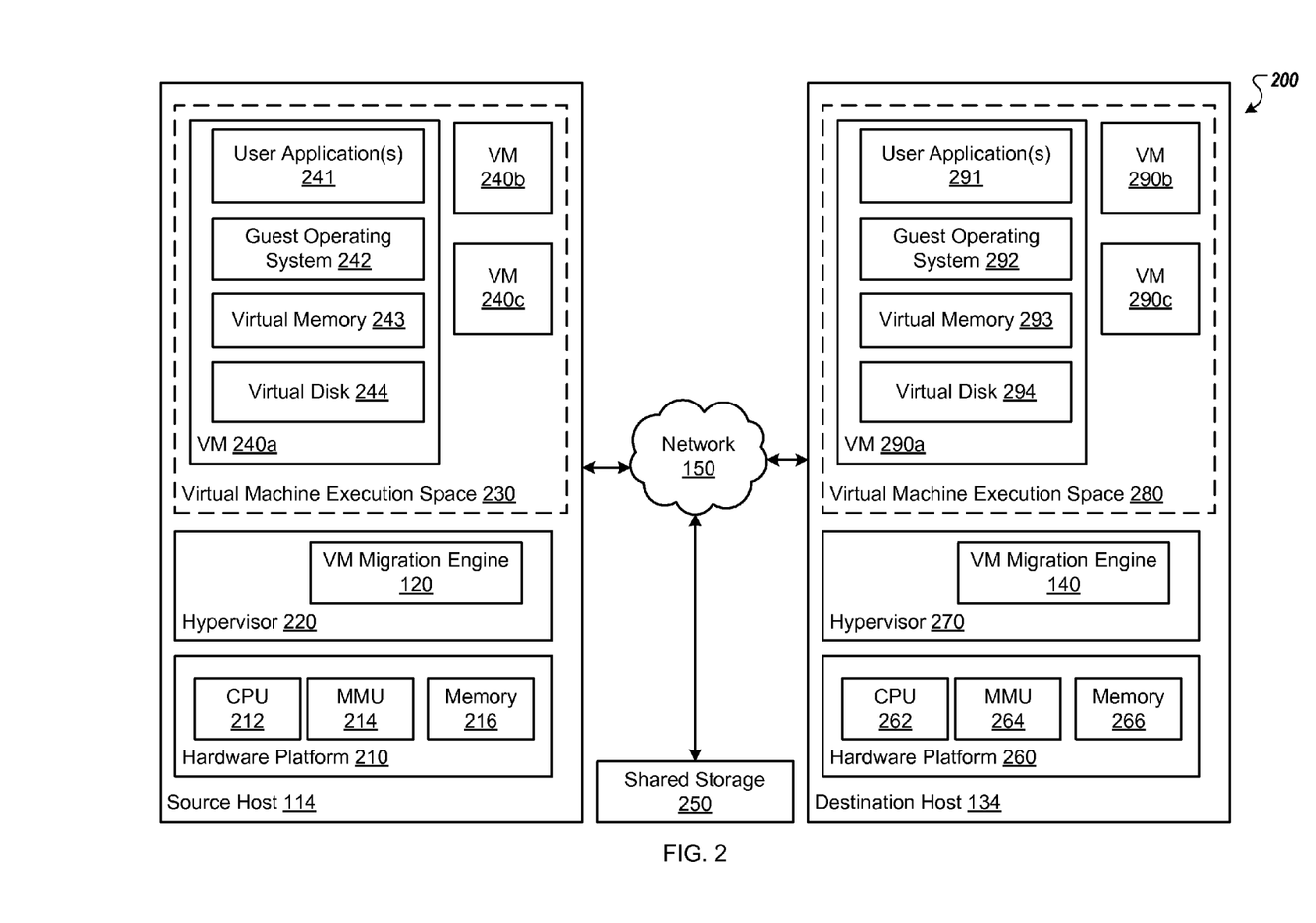
FIG. 2 shows example components of the source host and the destination host of FIG. 1.

FIG. 2 shows example components of the source host 114 and the destination host 134 of FIG. 1. The source host 114 is a physical machine that is configured to execute VMs 240a-240c using a hypervisor 220. The source host 114 is a physical computer system that includes one or more data processing apparatus that each includes a hardware platform 210. The hardware platform 210 may include, for example, a processor (CPU) 212, a memory management unit (MMU) 214, memory 216 (e.g., Random Access Memory (RAM)), a local storage unit (e.g., hard disk or flash memory), a network adapter, and so on.

The hypervisor 220 is a virtualization software layer that executes on the hardware platform 210. The hypervisor 220 manages a virtual machine execution space 230 within which one or more VMS 240a-240c may be concurrently instantiated and executed. Although three VMs 240a-240c are illustrated in FIG. 2, the hypervisor 220 can manage other numbers of VMs. For each VM 240a-240c, the hypervisor 220 manages a corresponding virtual hardware platform. Each virtual hardware platform includes emulated hardware, e.g., a virtual storage device, a virtual network adapter/interface, virtual memory, a virtual processor, and so on.

Each VM 240a-240c managed by the hypervisor 220 executes a guest operating system, e.g., guest OS 242, that executes user applications, e.g., user applications 241. The hypervisor 220 transforms input/output (I/O) requests from the guest OS 242 to the corresponding virtual hardware platform into corresponding requests to the hardware platform 210.

Each VM also includes virtual storage for storing data related to the VM. The virtual storage can include, e.g., virtual memory 243 and a virtual disk 244. The guest OS 242 and/or the user applications 241 can store data to and access data from the virtual memory 243 and the virtual disk 244. The hypervisor 220 can map the VM's virtual storage to hardware storage (e.g., hardware memory 216, local storage unit, and/or a shared storage unit 250). For example, when the guest OS 242 writes data to virtual memory 243, the hypervisor 220 can store the data in a corresponding location in hardware memory 216 based on the mapping. Similarly, when the guest OS 242 requests data from virtual memory 243, the hypervisor 220 can obtain the data from hardware memory 216 and provide the data to the guest OS 242. Similar mapping can be used to map the virtual disk 244 to a local storage unit or the shared storage unit 250.

The shared storage unit 250 is a data storage unit that is shared between the source host 114 and the destination host 134. The shared storage unit 250 may include one or more data storage units communicably coupled to the network 150. For example, the shared storage unit 250 may be implemented as a storage area network (SAN), network-attached storage (NAS), or another appropriate network storage technology. In an SAN implementation, the shared storage unit 250 may be communicably coupled to the source host 114 and the destination host 134 by way of a dedicated storage network. As described in more detail below, the use of shared storage allows for faster migration of VMs between the source host 114 and the destination host 134 than using local storage at each host.

In some implementations, shared storage may be implemented as stretched storage. For example, the shared storage unit 250 may be implemented using a data storage unit located at the source site and a data storage unit located at the destination site 130. The data stored in the data storage units can be replicated between each other such that the two data storage units appear to be a single data storage unit to the two sites 110 and 130.

The destination host 134 is configured to execute VMs 290a-290c using a hypervisor 270. The destination host 134 is a physical computer system that includes one or more data processing apparatus that each includes a hardware platform 260. The hardware platform 260 may include, for example, a processor (CPU) 262, an MMU 264, memory 266 (e.g., RAM), a local storage unit (e.g., hard disk or flash memory), a network adapter, and so on.

The hypervisor 270 executes on a hardware platform 260 and manages a virtual machine execution space 280 within which VMS 290a-290c may be concurrently instantiated and executed. Although three VMs 290a-290c are illustrated in FIG. 2, the hypervisor 270 can manage other numbers of VMs.

Each VM 290a-290c managed by the hypervisor 270 executes a guest operating system, e.g., guest OS 292, that executes user applications, e.g., user applications 291. The hypervisor 270 transforms input/output (I/O) requests from the guest OS 292 to the corresponding virtual hardware platform into corresponding requests to the hardware platform 260.

Each VM also includes virtual storage for storing data related to the VM. The virtual storage can include, e.g., virtual memory 293 and a virtual disk 294. The guest OS 292 and/or the user applications 291 can store data to and access data from the virtual memory 293 and the virtual disk 294. The hypervisor 270 can map the VM's virtual storage to hardware storage (e.g., hardware memory 266, local storage unit, and/or the shared storage unit 250). For example, when the guest OS 292 writes data to virtual memory 293, the hypervisor 270 can store the data in a corresponding location in hardware memory 266 based on the mapping. Similarly, when the guest OS 292 requests data from virtual memory 293, the hypervisor 270 can obtain the data from hardware memory 266 and provide the data to the guest OS 242. Similar mapping can be used to map the virtual disk 294 to a local storage unit or the shared storage unit 250.

As described above with reference to FIG. 1, the source host 114 includes a VM migration engine 120 that interacts with the VM migration engine 140 of the destination host 134 to migrate VMs, e.g., the VMs 240a-240b, from the source host 114 to the destination host 134. The VM migration engines 120 and 140 may be a part of their host's respective hypervisor 220 and 270. During the migration of a source VM, the migration engine 120 sends data regarding the source VM to the VM migration engine 140. This data may include data stored in the VM's virtual memory, data stored in the source VM's virtual disk 244, non-memory state information, and/or other appropriate data regarding the source VM.

By using a shared storage unit 250 that is shared between the source host 114 and the destination host 134, the data stored in the source VM's virtual disk 244 can be transferred without actually copying the data. Instead, the VM migration engine 120 can transfer data specifying the mapping of the source VM's virtual disk 244 to the VM migration engine 140. In turn, the VM migration engine 140 can map the virtual disk 294 of the corresponding destination VM to the same physical addresses in the shared storage unit 250 as the source VM. In implementations that do not employ shared storage, the data stored in the virtual disk 244 can be transferred to the destination host 134 during migration.

Figure 3:
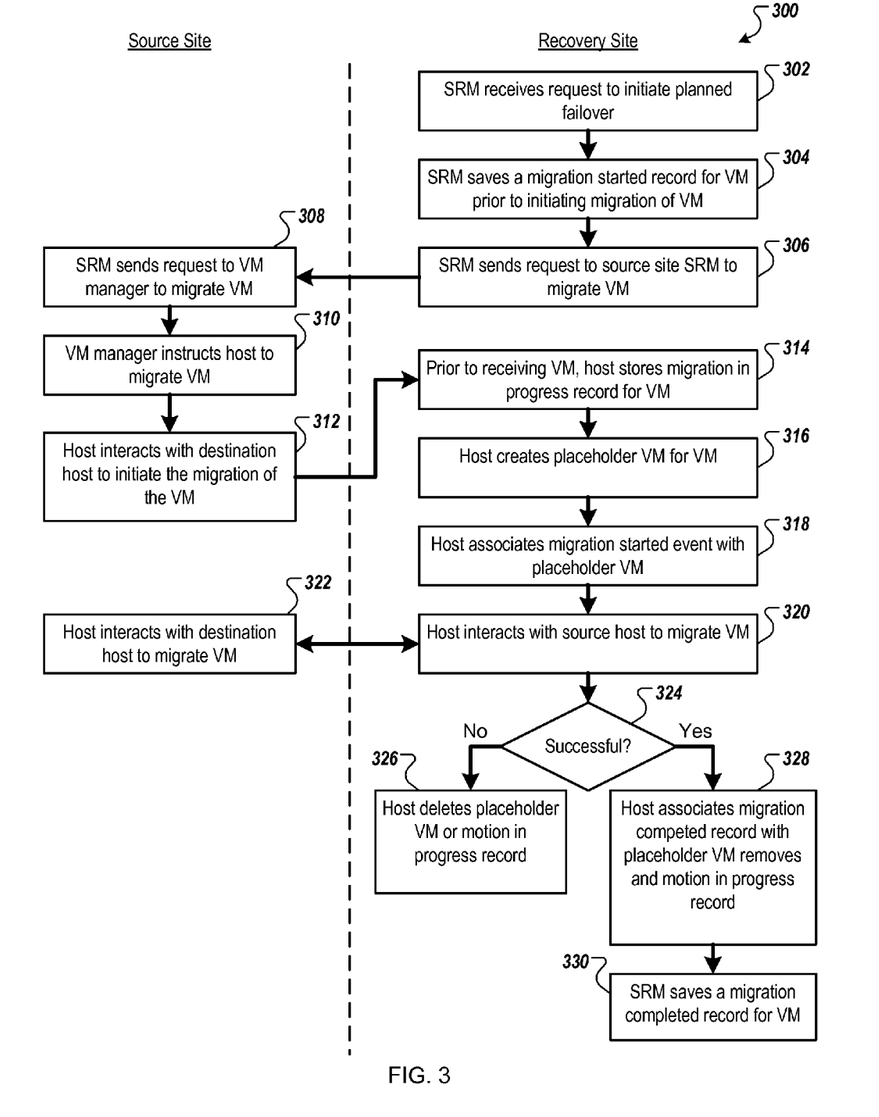
FIG. 3 shows a data flow of an example technique for migrating a VM from a source host located at a source site to a destination host located at a destination site.

FIG. 3 shows a data flow of an example technique 300 for migrating a VM from a source host located at a source site to a destination host located at a destination site. The example technique 300 is performed by a system of one or more computers. For example, the technique 300 may be performed by one or more physical machines configured to execute one or more virtual machines, e.g., the hosts 114 and 134 (and their respective VM migration engines 120 and 140), the SRMs 112 and 132, and/or the VM managers 116 and 136 of FIG. 1.

In the example technique 300, certain components of the system store data regarding the VM in response to certain actions or certain stages in the migration process so that the status of the VMs can be determined in the event of a fault or disaster at the source site. For example, one or more of the physical machines may become unavailable or may be destroyed by a disaster. Thus, the data may be stored at the destination site so that a physical machine at the destination site can determine the status of the VM using the stored data.

The system receives a request to initiate a planned failover of one or more VMs (302). For example, a destination SRM at a destination site at which the VM(s) are to be migrated may receive the request to initiate the planned failover.

The destination SRM saves a migration started record for a VM that is to be migrated as part of the planned failover (304). For example, the destination SRM may save the migration started record in a SRM migration data storage system, e.g., an SRM migration data system located at the destination site, before initiating the migration of that particular VM. The migration started record is a record that indicates that the process of migrating the VM has been initiated by the system and/or that migration of the VM is about to begin. If multiple VMs are being migrated as part of the planned failover, the VMs may not all be migrated concurrently. Instead, the VMs may be migrated in a sequence. Thus, the destination SRM may save a migration started record for each VM prior to initiating the migration of that particular VM.

The remaining operations of this technique 300 are described in terms of a particular VM. However, the acts can be performed for each VM that is being migrated as part of the planned failover.

The destination SRM sends a request to a source site server to migrate the VM (306). For example, the destination SRM may send the request to a source SRM located at the source site. The request may specify the VM to be transferred, e.g., using a unique identifier for the VM, and the destination host to which the VM is to be migrated.

The source SRM sends a request to a VM manager for the source site to migrate the VM (308). For example, in response to receiving the request from the destination SRM, the source SRM may instruct the source VM manager to coordinate the migration of the VM from a source host to the destination host. The VM manager can also concurrently coordinate the migration of other VMs from other source hosts. In some implementations, the destination SRM may send the request to the VM manager for the source site, for example, instead of sending the request to the source SRM.

The source VM manager instructs the source host to migrate the VM from the source host to the destination host (310). In response, the source host interacts with the destination host to initiate the migration of the VM (312). For example, a migration engine executing on the source host may establish communication with the destination host and provide data to the destination host that identifies the VM that is to be migrated.

The destination host stores a migration in progress record (314). For example, the destination host may store the migration in progress record in a host migration data storage system prior to the VM being migrated from the source host to the destination host. The migration in progress record is a record that indicates that the hosts are in the process of migrating the VM.

The destination host creates a placeholder VM for the VM that is to be migrated (316). The placeholder VM may have the same unique identifier as the VM that is to be migrated. In some implementations, the destination host may store data identifying the placeholder VM, e.g., the unique identifier of the placeholder VM, in the VM inventory of the destination VM manager. In this way, the destination VM manager has a record of the VMs that are executing or being migrated to the destination site.

The destination host associates a migration started event with the placeholder VM (318). The migration started event can indicate that migration of the VM that corresponds to the placeholder VM has been initiated or is about to begin. In some implementations, the migration started event may be a record stored in the host migration data storage system by the destination host.

The destination host interacts with the source host to migrate the VM (322). For example, the destination host may send data to the source host indicating that the destination hot is ready to receive data for the VM.

The source host interacts with the destination host to migrate the VM (324). For example, the source host may send data regarding the VM to the destination host. As described above, this data may include data stored in the VM's virtual memory, data stored in the VM's virtual disk, non-memory state information, and/or other appropriate data regarding the VM.

In some implementations, the VM is migrated while the source host continues to execute the VM. For example, the source host may send initial VM data for the VM. The initial VM data may include data stored in the VM's virtual memory, a mapping for the VM's virtual disk if the source host and destination host store VM data in a shared storage unit, and/or data stored in the VM's virtual disk if the source host stores data for the VM in a storage unit that is not shared with the destination host, e.g., a local storage unit. The source host may then determine whether any of the VM's data have changed after the initial data were sent. For example, the VM may have updated one or more memory pages or memory blocks while executing the VM. If any of the VM's data have changed, the VM may send to the destination host updated VM data that includes the updated memory pages and/or blocks.

After each iteration of sending updated VM data, the source host may evaluate one or more criteria to determine whether to complete the migration of the VM. The one or more criteria may include a threshold amount of VM data that is to be transferred to the destination host. If the amount of data satisfies the threshold, e.g., by being less than the threshold, the source host may complete the migration. For example, if only a small amount of memory has been updated since the last transfer of updated VM data, the source host may complete the migration of the VM by pausing the VM and transferring the updated memory and non-memory state information to the destination. The destination host may then restore the VM using the transferred VM data.

The destination host may also monitor the progress of the VM's migration and take action in response to certain conditions being met. For example, if the source host does not send any new updates for the VM within a specified amount of time, the destination host may abort the migration of the VM.

If the migration of the VM is not successful (324), the destination host adjusts data stored at the destination site to reflect that the VM has not been successfully migrated (326). For example, if the migration of the VM is aborted, e.g., due to not receiving updates within the specified amount of time, the destination host may delete the placeholder VM for the migrating VM and the migration in progress record. If the destination host crashes or incurs a fault that interrupts the migration while the migration is in progress, the destination host uses the migration in progress record to determine if the placeholder VM needs to be deleted. For example, when the destination host is recovering from a crash, it uses the presence of the migration in progress record to determine that the migration was in progress before the destination host crashed. In this case, the destination host deletes the placeholder VM and the corresponding migration in progress record.

If the migration of the VM is successful, the destination host adjusts data stored at the destination site to reflect that the VM has been successfully migrated (328). For example, the destination host may associate a migration completed event with the placeholder VM and remove the motion in progress record from the host migration data storage system.

The destination SRM stores a migration completed record for the VM in response to the VM being migrated successfully from the source host to the destination host. The migration completed record may be stored in the SRM migration data storage system and may indicate that the migration of the VM has been fully completed.

After the migration has completed, the VM may be executed by the destination host. For example, the VM may be restored in response to the migration being completed. Or, the VM may be restored in sequence with other VMs, for example, based on a predefined sequence as part of the planned failover.

Although the technique 300 has been described in relation to particular system components (e.g., SRMs and hosts), operations of the technique may be performed by other components or by a single component at each site. For example, a single server located at the destination site may perform each operation that occurs at the destination site and another server that is located at the source site may perform each operation that occurs at the source site.

Figure 4:
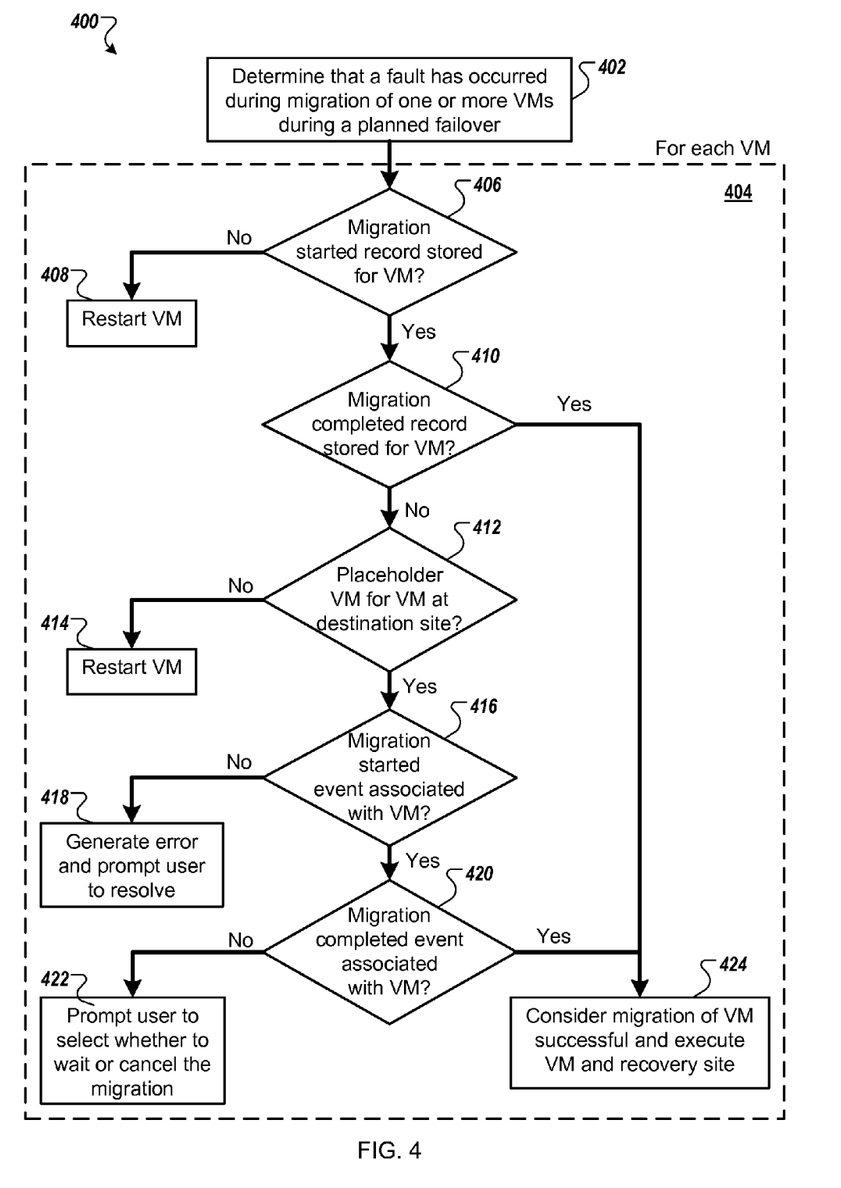
FIG. 4 is a flow diagram of an example technique for determining the status of one or more migrating VMs.

FIG. 4 is a flow diagram of an example technique 400 for determining the status of one or more migrating VMs. The example technique 400 is performed by a system of one or more computers. For example, the technique 400 may be performed by an SRM for a destination site, e.g., the destination SRM 132 of FIG. 1.

The system determines that a fault has occurred during a planned failover that includes the migration of one or more VMs (402). For example, the one or more VMs may be migrated from a source host located at a source site to a destination host at a destination site as part of the planned failover. During the planned failover, the source site may experience a disaster that makes the source host unavailable. The system may determine that a fault has occurred in response to losing communication with the source host or another physical machine located at the host site.

In some implementations, a user may terminate a planned failover, for example, in response to determining that the source site is going to experience a fault or disaster. For example, the user may issue a command to the destination SRM to terminate the planned failover in order to avoid waiting for a network timeout in the event that the fault or disaster occurs.

In response to determining that a fault has occurred during the planned failover or that the planned failover has been terminated by a user, the system may initiate an unplanned failover process. In some implementations, a user may cause the system to initiate the unplanned failover process in response to the fault or termination. In an unplanned failover, the system may assume that the source site is unavailable and continue the failover at the destination site. However, if the planned failover has been partially completed, e.g., some of the VMs have been migrated successfully, the migrated VMs do not have to be migrated again as they are already at the destination site. For VMs that were not migrated before the fault, the system can perform a manual restart of the VMs at the destination site as part of the unplanned failover process. The remaining acts of the example technique 400 can be used to determine the status of the VMs, for example, at the beginning of the unplanned failover process, to determine which VMs have been migrated and which VMs should be restarted at the destination site.

In response to determining that a fault has occurred, the system determines the status of each VM that is designated to be migrated (404). For example, the system may determine, for each VM of the planned failover, whether the VM was migrated successfully, whether the VM is in the process of being migrated, or whether the migration of the VM has not yet been initiated. The system can also perform some action for a VM based on its status. For example, if migration of a VM has not yet started, the system may cause the VM to be restarted at the destination site. As the source site may not be available, migration of the VM during the unplanned failover may not be possible. If migration of a VM was successfully completed prior to the fault, the VM may continue to execute at the destination site with no further action by the system.

To determine the status of a VM, the system determines whether a migration started record has been stored for the VM (406). For example, the system may access migration data stored at the destination site, e.g., in an SRM migration data storage system, to determine whether a migration started record for the VM has been stored in the migration data. As described above, the migration started record is a record that indicates that the process of migrating the VM has been initiated by the system and/or that migration of the VM is about to begin.

If the system determines that a migration started record has not been stored for the VM, the system may restart the VM at the destination site (408). For example, the absence of a migration started record for the VM may indicate that the SRM at the destination site had not initiated the migration of the VM.

If the system determines that a migration started record has been stored for the VM, the system may determine whether a migration completed record has been stored for the VM (410). For example, the system may access migration data stored at the destination site, e.g., in an SRM migration data storage system, to determine whether a migration completed record for the VM has been stored in the migration data. As described above, the migration completed record may indicate that the migration of the VM has been fully completed.

If the system determines that a migration completed record has been stored for the VM, the system may consider the migration of the VM successful (424). The migrated VM may be executed by the destination host. For example, the VM may be executed by the destination host after the migration of the VM was completed or restored in a sequence of VMs specified by the system.

If the system determines that a migration completed record has not been stored for the VM, the system determines whether a placeholder VM has been created as the destination site for the VM (412). For example, the absence of the migration completed record may indicate that the VM was in the process of being migrated when the fault occurred. The system can determine at what part of the process the VM was when the fault occurred. The system may access a VM inventory at the destination site to determine whether a placeholder VM having the same unique identifier as the migrating VM has been created at the destination site.

If the system determines that a placeholder VM has not been created for the VM at the destination site, the system may determine that the VM has not been migrated and restart the VM (414). For example, if the placeholder VM was not created before the fault, it may indicate that the source host had not initiated the migration with the destination VM.

In some cases, a user may initiate an unplanned failover between the time that the migration started event has been stored, but before the placeholder VM has been created. In such a case, a destination host may continue to try to migrate the VM from the source site while the system evaluates the status of the VM. If the destination host creates the placeholder VM after the system has determined that the placeholder VM has not been created for the VM, there may be two processes attempting to access files for the VM. For example, a restart process performed by the system may attempt to access files of the VM to restart the VM in response to determining that the placeholder VM has not been created, while the destination host also attempts to access the same files while continuing its attempt to migrate the VM. In such an example, one of the processes may lock the other process from the files, resulting in an error condition which can be handled by the user or the system. Such race conditions may also occur in other parts of the technique 400 and can be handled in a similar manner.

If the system determines that a placeholder VM has been created for the VM at the destination site, the system determines whether a migration started event has been associated with the placeholder VM (416). As described above, the migration started event can indicate that migration of the VM that corresponds to the placeholder VM has been initiated or is about to begin.

If the system determines that a migration started event has not been associated with the placeholder VM, the system determines that an error occurred during migration and prompts a user to resolve the error. For example, the existence of the placeholder VM without an associated motion started event may indicate that the fault occurred at the beginning of the migration of the VM before the motion started event could be associated with the VM. Or, it may indicate that an error occurred in the migration process or that a VM with the same unique identifier exists at the destination site. Thus, the system may prompt the user to select whether to wait to see if the VM is migrated to the destination site or to delete the placeholder VM and restart the VM at the destination site. The user may be prompted to ensure that a real, executing VM is not deleted. Alternatively, the system may restart the VM automatically in response to determining that the placeholder VM was created but does not have an associated motion started event.

If the system determines that the placeholder VM has an associated migration started event, the system determines whether the placeholder VM has an associated migration completed event (420). The migration completed event indicates that the destination host has completed the migration process for the VM.

If the system determines that the placeholder VM does not have an associated migration completed event, the system may prompt the user to select from two or more actions, e.g., to wait for the migration process to timeout or complete or to cancel the migration process. For example, the system may consider that the VM is in the process of being migrated based on the placeholder VM having a migration started event but not a migration completed event. The user may select to wait for the VM migration to complete or timeout. For example, the destination host may be configured to timeout and abort the migration process if the destination host does not receive data from the source host within a predefined period of time. In this example, if the user selects to wait, the migration process may timeout on its own if the source host does not recover from the fault in time, e.g., a disaster completely destroyed the source site. If the source host recovers, e.g., the source site is partially destroyed, the source host may avoid the timeout by providing data and the VM migration may complete as planned.

The user may also select to cancel the migration process for the VM. For example, the source host may be available but not available for enough time to complete the migration of the VM due to an impending threat. In this example, the user may select to cancel the migration of the VM and rerun the failover in the unplanned failover mode which will restart the VM at the destination site.

If the system determines that the placeholder VM does have an associated migration completed event, the system may determine that the migration of the VM was successful (424). The migrated VM may be executed by the destination host. For example, the VM may be executed by the destination after the migration completed or restored in a sequence of VMs specified by the system.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   initiating a migration of one or more virtual machines from a source host that is located at a source site to a destination host that is located at a destination site;
   determining that a fault has occurred during the migration of the one or more virtual machines, the fault resulting in the source host becoming unavailable;
   in response to determining that the fault has occurred, determining, while the source host is unavailable and for each virtual machine of the one or more virtual machines, whether the virtual machine has been fully migrated from the source host to the destination host, the determining comprising:
      determining whether a migration started record has been stored at the destination site for the virtual machine, the migration started record being a record that is stored prior to migrating the virtual machine;
      in response to determining that the migration started record has been stored at the destination site, determining whether a placeholder virtual machine that has a unique identifier that matches a unique identifier for the virtual machine has been created at the destination site;
      in response to determining that the placeholder virtual machine has been created at the destination site, determining whether the placeholder virtual machine has an associated migration completed event, the migration completed event being an event associated with the placeholder virtual machine in response to migration of the virtual machine being completed; and
      in response to determining that the placeholder virtual machine has an associated migration completed event, determining that the virtual machine has been fully migrated from the source host to the destination host.

2. The method of claim 1, further comprising:
   in response to determining that the migration started record has been stored for the virtual machine, determining whether a migration completed record has been stored at the destination site for the virtual machine, the migration completed record being a record that is stored in response to migration of the virtual machine being completed; and
   in response to determining whether the migration completed record has been stored at the destination site for the virtual machine, determining that the virtual machine has been fully migrated to the destination site.

3. The method of claim 1, further comprising:
   determining whether the placeholder virtual machine has an associated migration started event, the migration started event being an event associated with the placeholder virtual machine prior to initiating migration of the virtual machine; and
   in response to determining that the placeholder virtual machine does not have an associated migration started event, generating an error and prompting a user to select an action to resolve the error.

4. The method of claim 3, further comprising, in response to determining that the placeholder virtual machine has an associated migration started event but does not have an associated migration completed event:
   determining that migration of the virtual machine is in progress; and
   prompting a user to select whether (i) to wait for migration of the virtual machine to complete or timeout or (ii) to cancel the migration and restart the virtual machine at the destination host.

5. The method of claim 1, wherein determining whether each virtual machine has been fully migrated from the source host to the destination host is performed by a site recovery manager executing at the destination site.

6. The method of claim 1, wherein:
   a site recovery manager executing at the destination site stores the migration started record for the virtual machine prior to initiating migration of the virtual machine from the source host to the destination host; and
   the site recovery manager executing at the destination site stores the migration completed record for the virtual machine in response to migration of the virtual machine being successfully completed.

7. The method of claim 1, further comprising, in response to determining that the migration started record has not been stored for the virtual machine:
   determining that the virtual machine has not been migrated to the destination host; and
   causing the virtual machine to be restarted at the destination host rather than waiting for the virtual machine to be migrated from the source host to the destination host.

8. The method of claim 1, further comprising:
   creating the placeholder virtual machine for the virtual machine and assigning the unique identifier for the virtual machine to the placeholder virtual machine prior to initiating migration of the virtual machine;
   associating the migration started event with the placeholder virtual machine prior to initiating migration of the virtual machine; and
   associating the migration completed event with the placeholder virtual machine after migration of the virtual machine has completed.

9. The method of claim 1, further comprising, in response to determining that the placeholder virtual machine has not been created at the destination site:
   determining that the virtual machine has not been migrated to the destination host; and
   causing the virtual machine to be restarted at the destination host rather than waiting for the virtual machine to be migrated from the source host to the destination host.

10. A system comprising:
    a data processing apparatus; and
    a computer storage medium in data communication with the data processing apparatus and storing instructions executable by the data processing apparatus and that upon such execution cause the data processing apparatus to perform operations comprising:
       initiating a migration of one or more virtual machines from a source host that is located at a source site to a destination host that is located at a destination site;
       determining that a fault has occurred during the migration of the one or more virtual machines, the fault resulting in the source host becoming unavailable;

in response to determining that the fault has occurred, determining, while the source host is unavailable and for each virtual machine of the one or more virtual machines, whether the virtual machine has been fully migrated from the source host to the destination host, the determining comprising:
- determining whether a migration started record has been stored at the destination site for the virtual machine, the migration started record being a record that is stored prior to migrating the virtual machine;
- in response to determining that the migration started record has been stored at the destination site, determining whether a placeholder virtual machine that has a unique identifier that matches a unique identifier for the virtual machine has been created at the destination site;
- in response to determining that the placeholder virtual machine has been created at the destination site, determining whether the placeholder virtual machine has an associated migration completed event, the migration completed event being an event associated with the placeholder virtual machine in response to migration of the virtual machine being completed; and
- in response to determining that the placeholder virtual machine has an associated migration completed event, determining that the virtual machine has been fully migrated from the source host to the destination host.

11. The system of claim 10, wherein the operations further comprise:
- in response to determining that the migration started record has been stored for the virtual machine, determining whether a migration completed record has been stored at the destination site for the virtual machine, the migration completed record being a record that is stored in response to migration of the virtual machine being completed; and
- in response to determining whether the migration completed record has been stored at the destination site for the virtual machine, determining that the virtual machine has been fully migrated to the destination site.

12. The system of claim 10, wherein the operations further comprise:
- determining whether the placeholder virtual machine has an associated migration started event, the migration started event being an event associated with the placeholder virtual machine prior to initiating migration of the virtual machine; and
- in response to determining that the placeholder virtual machine does not have an associated migration started event, generating an error and prompting a user to select an action to resolve the error.

13. The system of claim 12, wherein the operations further comprise, in response to determining that the placeholder virtual machine has an associated migration started event but does not have an associated migration completed event:
- determining that migration of the virtual machine is in progress; and
- prompting a user to select whether (i) to wait for migration of the virtual machine to complete or timeout or (ii) to cancel the migration and restart the virtual machine at the destination host.

14. The system of claim 10, wherein:
- a site recovery manager executing at the destination site stores the migration started record for the virtual machine prior to initiating migration of the virtual machine from the source host to the destination host; and
- the site recovery manager executing at the destination site stores the migration completed record for the virtual machine in response to migration of the virtual machine being successfully completed.

15. The system of claim 10, wherein the operations further comprise, in response to determining that the migration started record has not been stored for the virtual machine:
- determining that the virtual machine has not been migrated to the destination host; and
- causing the virtual machine to be restarted at the destination host rather than waiting for the virtual machine to be migrated from the source host to the destination host.

16. The system of claim 10, wherein the operations further comprise:
- creating the placeholder virtual machine for the virtual machine and assigning the unique identifier for the virtual machine to the placeholder virtual machine prior to initiating migration of the virtual machine;
- associating the migration started event with the placeholder virtual machine prior to initiating migration of the virtual machine; and
- associating the migration completed event with the placeholder virtual machine after migration of the virtual machine has completed.

17. The system of claim 10, wherein the operations further comprise, in response to determining that the placeholder virtual machine has not been created at the destination site:
- determining that the virtual machine has not been migrated to the destination host; and
- causing the virtual machine to be restarted at the destination host rather than waiting for the virtual machine to be migrated from the source host to the destination host.

18. A computer storage medium encoded with a computer program, the program comprising instructions that when executed by data processing apparatus cause the data processing apparatus to perform operations comprising:
- initiating a migration of one or more virtual machines from a source host that is located at a source site to a destination host that is located at a destination site;
- determining that a fault has occurred during the migration of the one or more virtual machines, the fault resulting in the source host becoming unavailable;
- in response to determining that the fault has occurred, determining, while the source host is unavailable and for each virtual machine of the one or more virtual machines, whether the virtual machine has been fully migrated from the source host to the destination host, the determining comprising:
    - determining whether a migration started record has been stored at the destination site for the virtual machine, the migration started record being a record that is stored prior to migrating the virtual machine;
    - in response to determining that the migration started record has been stored at the destination site, determining whether a placeholder virtual machine that has a unique identifier that matches a unique identifier for the virtual machine has been created at the destination site;
    - in response to determining that the placeholder virtual machine has been created at the destination site, determining whether the placeholder virtual machine has an associated migration completed event, the migration completed event being an event associated with the placeholder virtual machine in response to migration of the virtual machine being completed; and in response to determining that the placeholder virtual machine has an associated migration completed event, determining that the virtual machine has been fully migrated from the source host to the destination host.

19. The computer storage medium of claim 18, wherein the operations further comprise:

in response to determining that the migration started record has been stored for the virtual machine, determining whether a migration completed record has been stored at the destination site for the virtual machine, the migration completed record being a record that is stored in response to migration of the virtual machine being completed; and in response to determining whether the migration completed record has been stored at the destination site for the virtual machine, determining that the virtual machine has been fully migrated to the destination site.

20. The computer storage medium of claim 18, wherein the operations further comprise:

determining whether the placeholder virtual machine has an associated migration started event, the migration started event being an event associated with the placeholder virtual machine prior to initiating migration of the virtual machine; and in response to determining that the placeholder virtual machine does not have an associated migration started event, generating an error and prompting a user to select an action to resolve the error.

\* \* \* \* \*